(12) United States Patent
Wang

(10) Patent No.: US 12,103,504 B2
(45) Date of Patent: Oct. 1, 2024

(54) HYDRAULIC BRAKE AND ELECTRONIC PARKING INTEGRATED CALIPER

(71) Applicant: CCYS HI-TECH INTERNATIONAL LTD., Taichung (TW)

(72) Inventor: Sheng-Yu Wang, Taichung (TW)

(73) Assignee: CCYS HI-TECH INTERNATIONAL LTD., Taichung (TW)

( * ) Notice: Subject to any disclaimer, the term of this patent is extended or adjusted under 35 U.S.C. 154(b) by 419 days.

(21) Appl. No.: 17/551,850

(22) Filed: Dec. 15, 2021

(65) Prior Publication Data

US 2022/0212644 A1 Jul. 7, 2022

(30) Foreign Application Priority Data

Jan. 7, 2021 (TW) .................................. 110200202

(51) Int. Cl.
| | |
|---|---|
| *B60T 13/74* | (2006.01) |
| *B60T 1/06* | (2006.01) |
| *B60T 13/58* | (2006.01) |
| *F16D 55/228* | (2006.01) |
| *F16D 65/00* | (2006.01) |
| *F16D 65/097* | (2006.01) |

(Continued)

(52) U.S. Cl.
CPC .............. *B60T 13/58* (2013.01); *B60T 1/065* (2013.01); *B60T 13/746* (2013.01); *F16D 55/228* (2013.01); *F16D 65/0068* (2013.01); *F16D 65/0977* (2013.01); *F16D 65/18* (2013.01); *F16D 2055/0016* (2013.01); *F16D 2121/04* (2013.01); *F16D 2121/24* (2013.01); *F16D 2125/06* (2013.01); *F16D 2125/40* (2013.01)

(58) Field of Classification Search
CPC .............. F16D 55/228; F16D 65/0068; F16D 65/0977; F16D 65/18; F16D 2055/0016; F16D 2121/04; F16D 2121/24; F16D 2125/06; F16D 2125/40; B60T 13/58; B60T 1/065; B60T 13/746; B60T 13/741
See application file for complete search history.

(56) References Cited

U.S. PATENT DOCUMENTS

| | | | | |
|---|---|---|---|---|
| 3,592,301 | A | * | 7/1971 | Auth .................... F16D 65/0977 188/73.43 |
| 4,494,630 | A | * | 1/1985 | Stoka ...................... F16D 65/54 188/196 R |

(Continued)

*Primary Examiner* — Nicholas J Lane
(74) *Attorney, Agent, or Firm* — Birch, Stewart, Kolasch & Birch, LLP

(57) ABSTRACT

A hydraulic brake and electronic parking integrated caliper includes a base, a main body movable relative to the base, two brake pads movable relative to the main body, two hydraulic pistons for pushing the brake pads, an electronic drive fixed to the main body, a threaded rod driven by the electronic drive to rotate, and a linearly displacing member displaceable relative to the threaded rod. When moving from a first position to a second position, the linearly displacing member pushes a hydraulic piston and a brake pad toward a direction to press against a brake disc. When moving from the second position to a third position, the linearly displacing member moves the threaded rod, electronic drive and main body toward another direction to make the other hydraulic piston and brake pad press against the brake disc. The caliper has simple structure and generates larger clamping force.

14 Claims, 11 Drawing Sheets

(51) Int. Cl.
*F16D 65/18* (2006.01)
*F16D 55/00* (2006.01)
*F16D 121/04* (2012.01)
*F16D 121/24* (2012.01)
*F16D 125/06* (2012.01)
*F16D 125/40* (2012.01)

(56) References Cited

U.S. PATENT DOCUMENTS

| | | | | |
|---|---|---|---|---|
| 4,795,004 A * | 1/1989 | Bauer | ............... | B60T 11/04 |
| | | | | 188/106 A |
| 6,073,733 A * | 6/2000 | Kapanowski | ........... | F16D 65/18 |
| | | | | 188/72.4 |
| 7,958,976 B2 * | 6/2011 | Morio | ............... | F16D 65/0977 |
| | | | | 188/73.38 |
| 2013/0256068 A1 * | 10/2013 | Hazeki | ............... | F16D 55/226 |
| | | | | 188/72.4 |
| 2015/0027822 A1 * | 1/2015 | Cerutti | ............... | F16D 65/0977 |
| | | | | 188/73.47 |
| 2019/0120306 A1 * | 4/2019 | Satoh | ............... | F16D 65/0068 |

\* cited by examiner

HYDRAULIC BRAKE AND ELECTRONIC PARKING INTEGRATED CALIPER

BACKGROUND OF THE INVENTION

1. Field of the Invention

The present invention relates generally to calipers of disc brakes and more particularly, to a hydraulic brake and electronic parking integrated caliper.

2. Description of the Related Art

The conventional brake systems used in cars include a service brake system commonly referred to as foot brake, and a parking brake system commonly referred to as hand brake. The service brake system acts on four wheels at the same time, but the parking brake system usually acts on two drive wheels (e.g., rear wheels) only. In each of the brake systems, two brake pads of a caliper, which are commonly referred to as linings, are primarily adopted to clamp a brake disc fixed to the wheel to attain braking effect on the wheels.

The conventional service brake system and parking brake system are usually operated in a way that the driver steps on a brake pedal or pull a handbrake lever to actuate a hydraulic drive, so that the hydraulic drive drives the aforementioned caliper to make the brake pads clamp the brake disc to attain the braking effect. Alternatively, in the parking brake system, an electronic drive (e.g., motor) may be adopted to drive the caliper, so that the driver can control the parking brake function by a button or other kinds of effort-saving switches. However, the above-described caliper driven by the electronic drive is usually integrated with single one hydraulic piston to attain hydraulic brake function (i.e., service brake function), but the clamping force thereof still needs to be improved.

SUMMARY OF THE INVENTION

The present invention has been accomplished in view of the above-noted circumstances. It is an objective of the present invention to provide a hydraulic brake and electronic parking integrated caliper, which is driven by a hydraulic drive and an electronic drive to attain service brake and parking brake functions, and the present invention is simple in structure and can generate relatively larger clamping force.

To attain the above objective, the present invention provides a hydraulic brake and electronic parking integrated caliper which includes a base, a main body disposed on the base and movable relative to the base along an axis, first and second brake pads disposed in the main body and individually movable relative to the main body along the axis, first and second hydraulic pistons disposed in the main body and capable of being driven by a hydraulic source to move relative to the main body along the axis, an electronic drive fixed to the main body, a threaded rod disposed on the electronic drive capably of being driven by the electronic drive to rotate and inserted into the main body, and a linearly displacing member screwed onto the threaded rod and capable of being driven by the threaded rod to linearly displace relative to the threaded rod along the axis to first, second and third positions. The hydraulic brake and electronic parking integrated caliper is adapted for a brake disc to be disposed between the first and second brake pads. When being driven by the hydraulic source, the first and second hydraulic pistons respectively push the first and second brake pads to move toward first and second directions to press against the brake disc. When the linearly displacing member is moved relative to the threaded rod from the first position to the second position, the linearly displacing member pushes the first hydraulic piston and the first brake pad to move toward the first direction to press against the brake disc. When the linearly displacing member is moved relative to the threaded rod from the second position to the third position, the threaded rod, the electronic drive and the main body are moved toward the second direction to make the second hydraulic piston and the second brake pad press against the brake disc.

As a result, the present invention provides the structurally simple integrated caliper driven by the electronic drive and having two hydraulic pistons for being driven by the hydraulic drive, which can not only attain service brake and parking brake functions, but also generate larger clamping force than the caliper with single one hydraulic piston.

Further scope of applicability of the present invention will become apparent from the detailed description given hereinafter. However, it should be understood that the detailed description and specific examples, while indicating preferred embodiments of the invention, are given by way of illustration only, since various changes and modifications within the structural features and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 6 shows a hydraulic brake condition;

DETAILED DESCRIPTION OF THE INVENTION

First of all, it is to be mentioned that in the following embodiment and claims, when it is mentioned that an element is disposed on another element, it means that the former element is directly disposed on the latter element, or the former element is indirectly disposed on the latter element through one or more other elements between aforesaid former and latter elements. When it is mentioned that an element is directly disposed on another element, it means that no other element is disposed between aforesaid former and latter elements.

Figure 1:
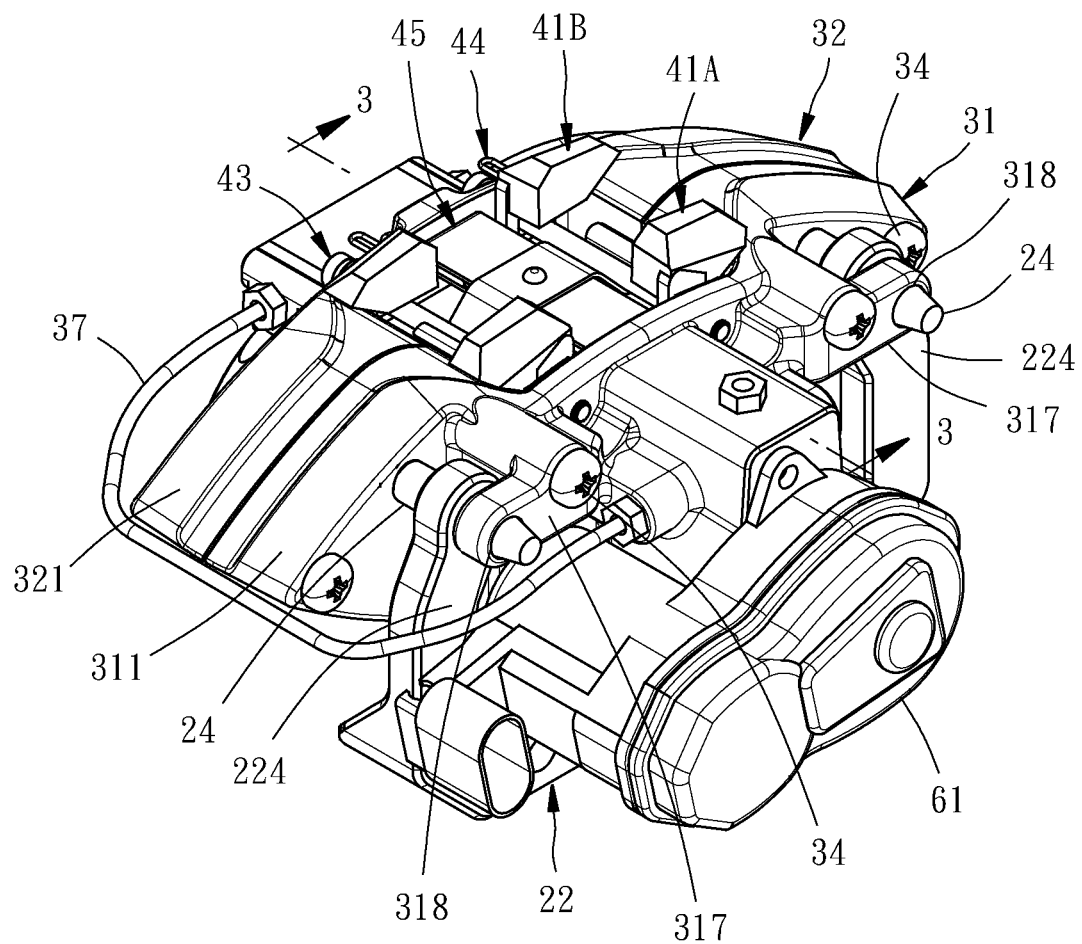
FIG. 1 is an assembled perspective view of a hydraulic brake and electronic parking integrated caliper according to a preferred embodiment of the present invention.
Figure 2:
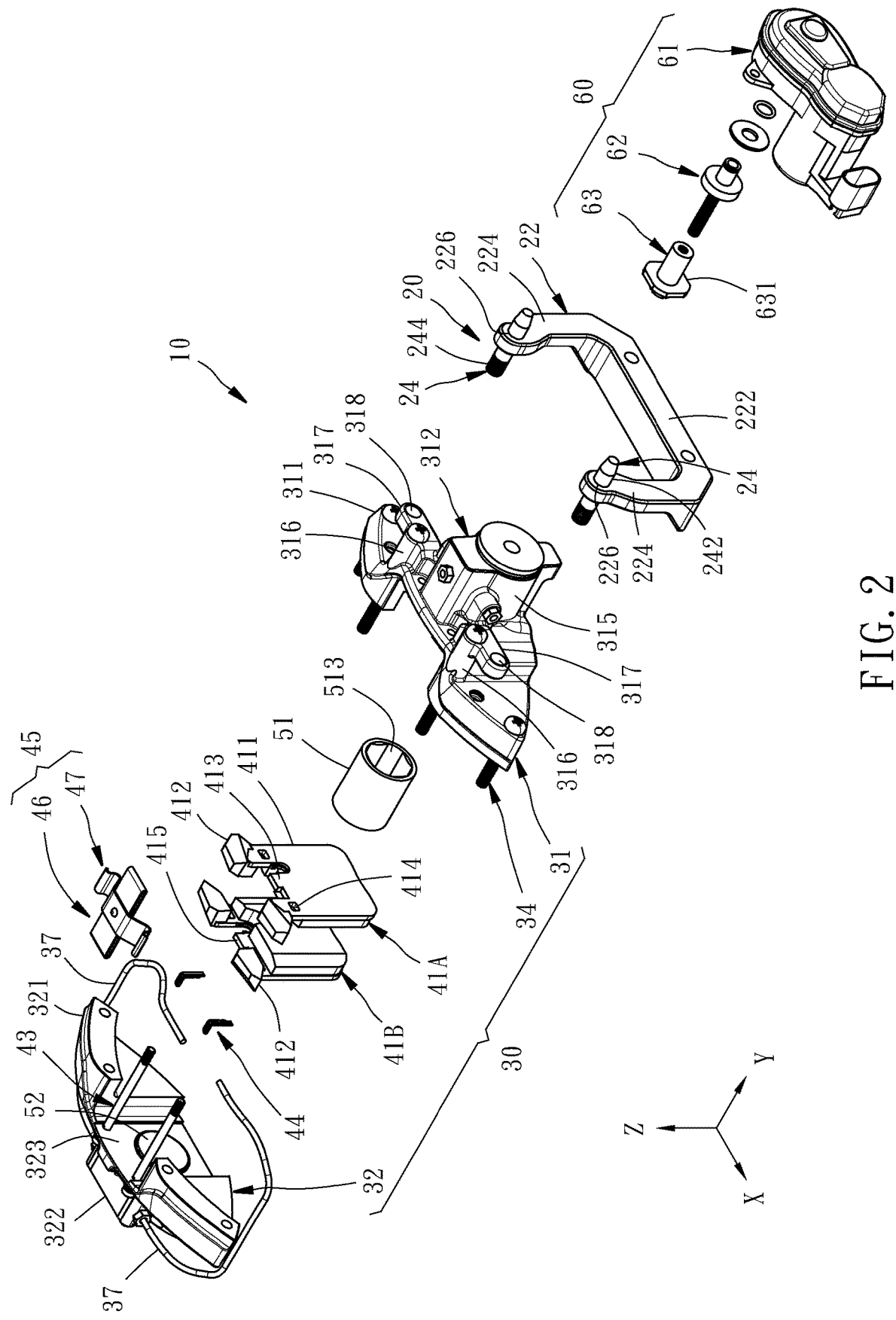
FIG. 2 is an exploded perspective view of the hydraulic brake and electronic parking integrated caliper according to the preferred embodiment of the present invention.
Figure 7:
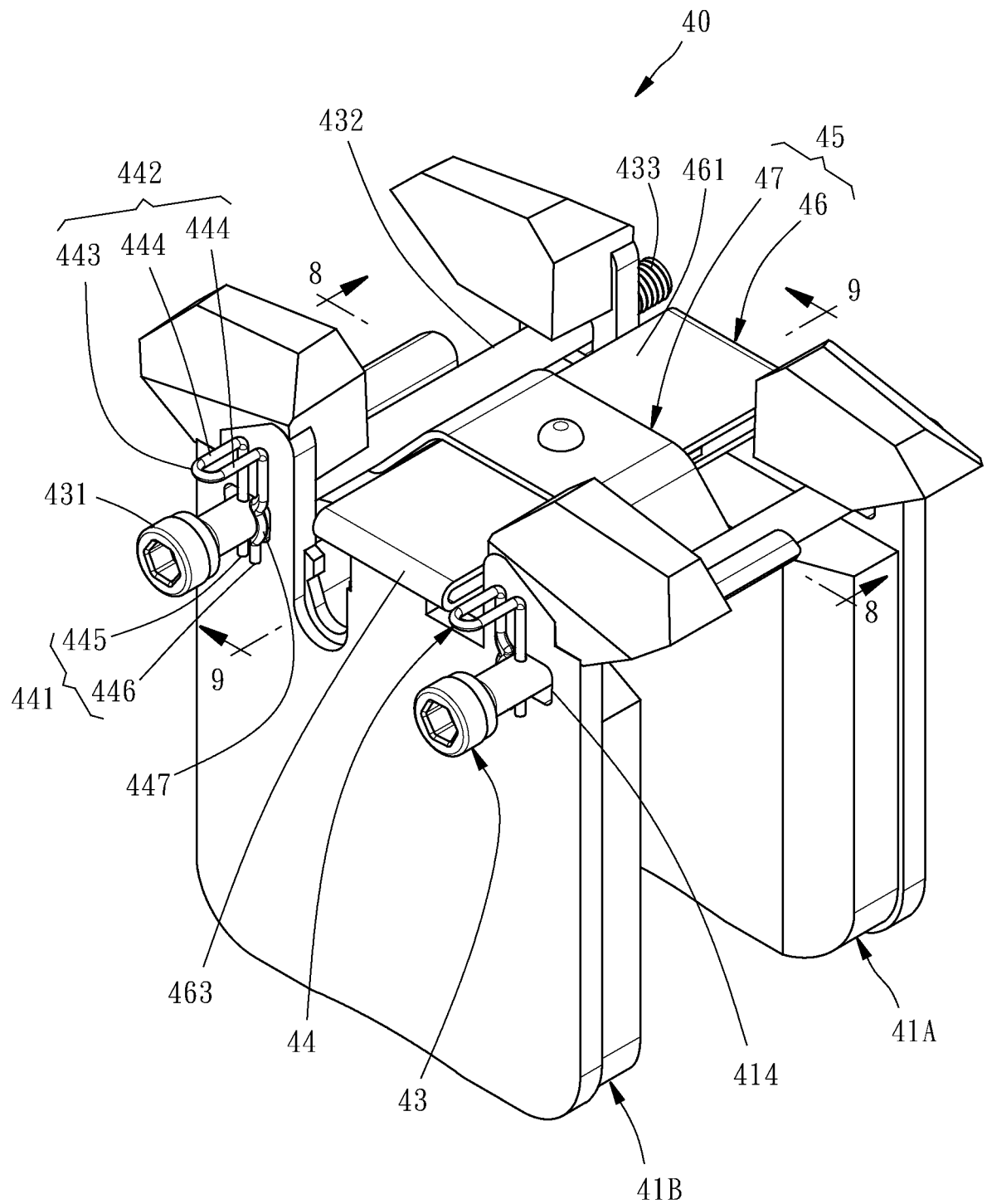
FIG. 7 is an assembled perspective view of a brake pad assembly of the hydraulic brake and electronic parking integrated caliper.

Referring to FIG. 1, FIG. 2 and FIG. 7, a hydraulic brake and electronic parking integrated caliper 10 according to a preferred embodiment of the present invention primarily includes a base assembly 20, a main body 30, a brake pad assembly 40 as shown in FIG. 7, a first hydraulic piston 51, a second hydraulic piston 52, and a linear displacement device 60.

As shown in FIG. 2, the base assembly 20 includes a base 22, and two shafts 24. The base 22 includes a basal portion 222 extending as an elongated shape along a first axis (i.e., X-axis), and two installation arms 224 extending upwardly from two ends of the basal portion 222 respectively along a second axis (i.e., Z-axis). The basal portion 222 is adapted to be fixed to a fixed portion of a car to make the caliper 10 installed on the car. Each of the installation arms 224 has a through hole 226 penetrating through the part of the installation arm 224 close to the top end thereof along a third axis (i.e., Y-axis). Each of the shafts 24 includes an insert portion 242, and a threaded portion 244 located at an end of the insert portion 242 and having threads.

Figure 3:
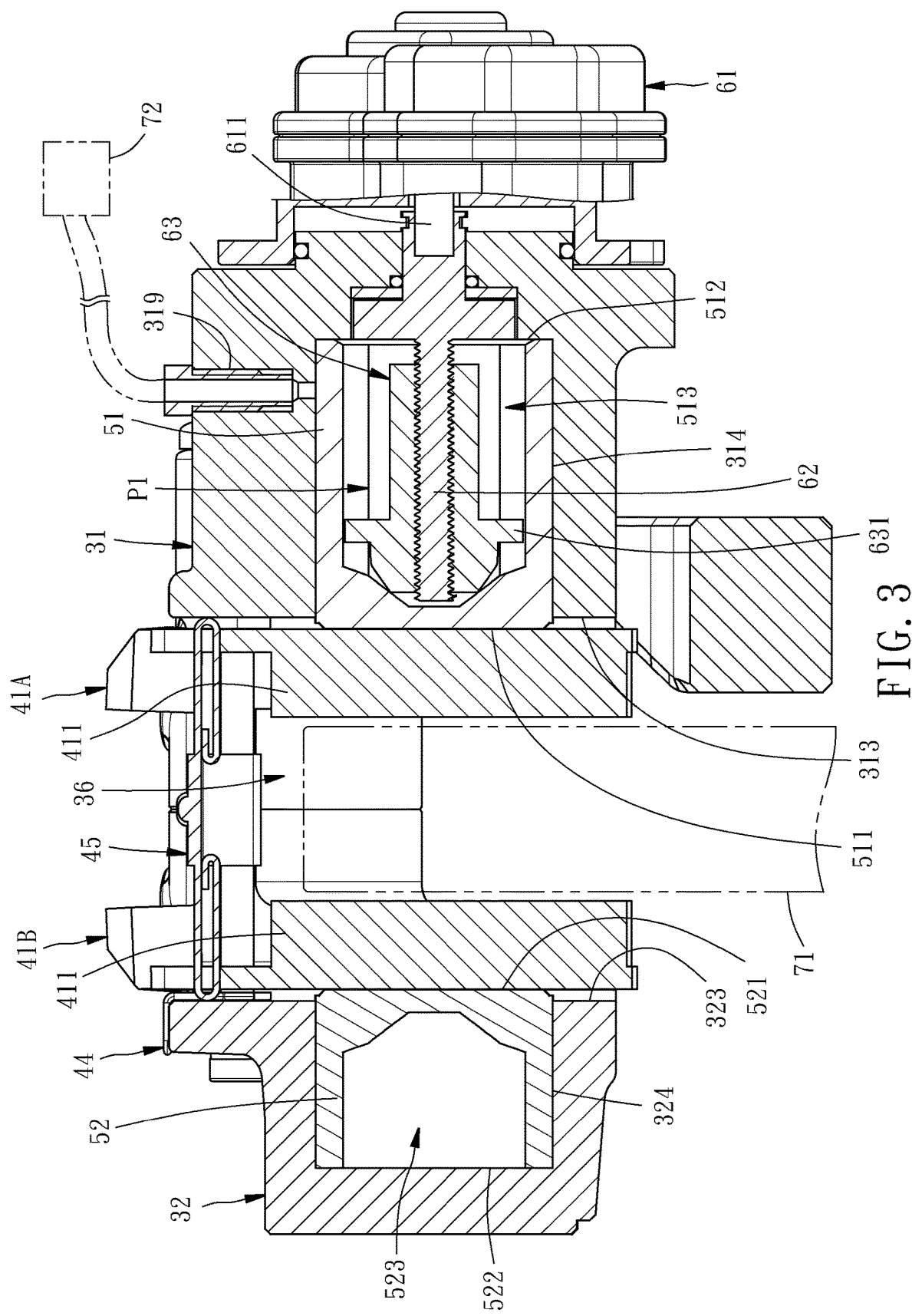
FIG. 3 is a sectional view taken along the line 3-3 in FIG. 1, showing a status that first and second brake pads of the hydraulic brake and electronic parking integrated caliper both don't press against a brake disc.
Figure 4:
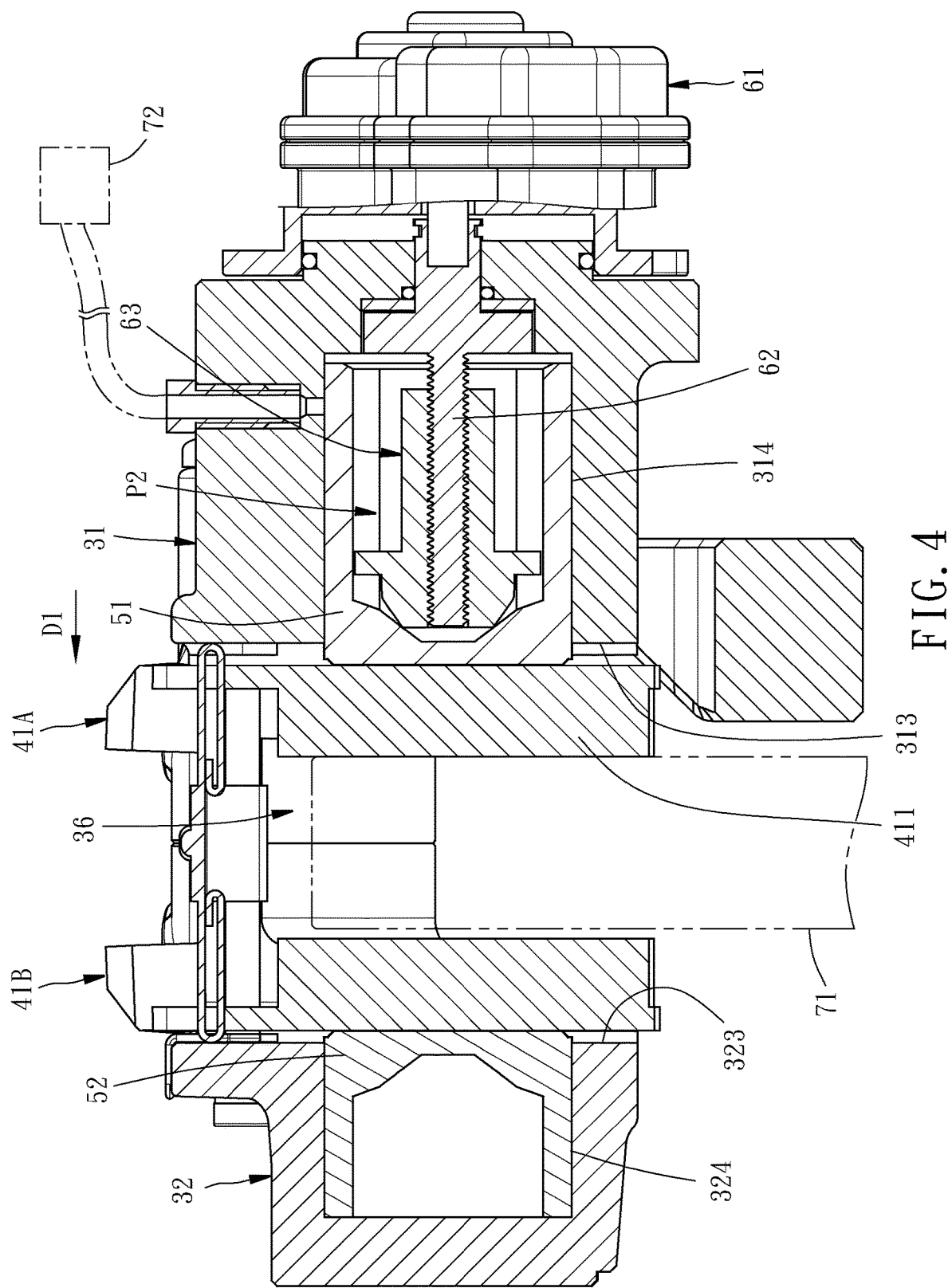
FIG. 4 is similar to FIG. 3, but showing another status that the first brake pad of the hydraulic brake and electronic parking integrated caliper presses against the brake disc and the second brake pad doesn't press against the brake disc.
Figure 5:
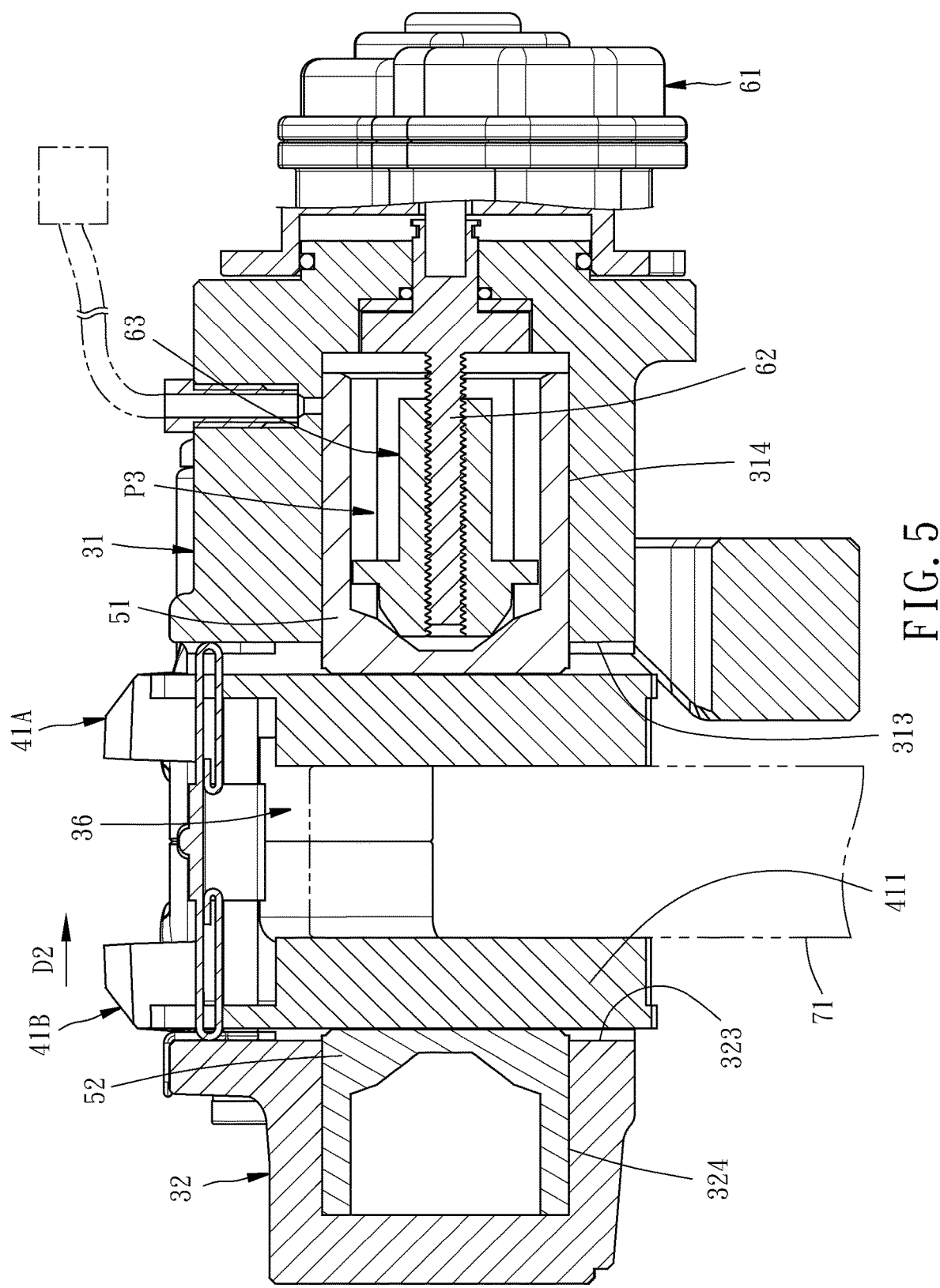
FIG. 5 is similar to FIG. 3, but showing still another status that the first and second brake pads of the hydraulic brake and electronic parking integrated caliper both press against the brake disc.

The main body 30 includes a first installation seat 31, a second installation seat 32, and four bolts 34. Each of the first and second installation seats 31 and 32 includes a connecting portion 311 or 321 approximately plate-shaped along X-Z plane, and a protruding portion 312 or 322 connected with the connecting portion 311 or 321 integrally. Referring to FIG. 2 to FIG. 5, the connecting portion 311 of the first installation seat 31 is provided on a side thereof with a first inner surface 313 facing toward the negative direction of Y-axis (also referred to as first direction D1, as shown in FIG. 4). The protruding portion 312 protrudes from another side of the connecting portion 311 toward the positive direction of Y-axis (also referred to as second direction D2, as shown in FIG. 5). On the contrary, the connecting portion 321 of the second installation seat 32 is provided on a side thereof with a second inner surface 323 facing toward the second direction D2. The protruding portion 322 protrudes from another side of the connecting portion 321 toward the first direction D1. The protruding portions 312 and 322 of the first and second installation seats 31 and 32 are provided therein with a first hydraulic cylinder 314 and a second hydraulic cylinder 324, respectively. The first hydraulic cylinder 314 extends from the first inner surface 313 toward the second direction D2, which means the opening thereof is located on the first inner surface 313. The second hydraulic cylinder 324 extends from the second inner surface 323 toward the first direction D1, which means the opening thereof is located on the second inner surface 323. As shown in FIG. 2, the protruding portion 312 of the first installation seat 31 includes a middle section 315 provided therein with the first hydraulic cylinder 314, two fastened sections 316 located on two sides of the middle section 315 respectively, and two extending arms 317 extending from the two fastened sections 316 toward the positive and negative directions of X-axis respectively. Each of the extending arms 317 has a through hole 318 penetrating through the part of the extending arm 317 close to the terminal end thereof along Y-axis. The four bolts 34 are inserted through the fastened sections 316 and connecting portion 311 of the first installation seat 31 and screwed into the connecting portions 321 of the second installation seat 32. As a result, the first and second installation seats 31 and 32 are fixed to each other, and an accommodating space 36 is formed between the first and second inner surfaces 313 and 323 to accommodate the brake pad assembly 40, as shown in FIG. 3.

Referring to FIG. 1 and FIG. 2, the two installation arms 224 of the base 22 are located between the connecting portion 311 and the two extending arms 317 of the first installation seat 31 respectively. The insert portions 242 of the two shafts 24 are inserted through the through holes 318 of the two extending arms 317 respectively, and inserted through the through holes 226 of the two installation arms 224 respectively. The threaded portions 244 of the two shafts 24 are threadedly fixed to the connecting portions 311 of the first installation seat 31. As a result, the main body 30 is attached to the base 22 by the two shafts 24, and the two shafts 24 are slidable linearly in the through holes 226, so that the main body 30 is movable relative to the base 22 along Y-axis.

Referring to FIG. 2 and FIG. 7, the brake pad assembly 40 includes a first brake pad 41A, a second brake pad 41B, two supporting pillars 43, two limiting members 44, and a suppressing member 45. The first and second brake pads 41A and 41B are the same in shape but arranged symmetrically to each other with respect to X-Z plane. Each of the first and second brake pads 41A and 41B includes a pressing portion 411 approximately shaped as a rectangular plate along X-Z plane, and two outer extending portions 412 and an inner extending portion 413, which extend upwardly from the pressing portion 411. Each junction of the outer extending portion 412 and the pressing portion 411 is provided with a rectangular through hole 414. The top surface 415 of the inner extending portion 413 is lower than the outer extending portions 412, so that the tops of the first and second brake pads 41A and 41B are approximately U-shaped. Each of the supporting pillars 43 has a head portion 431, a rod portion 432 and a threaded portion 433, which are integrally connected in order. The rod portion 432 is inserted toward the second direction D2 through the connecting portion 321 of the second installation seat 32, the through hole 414 of the second brake pad 41B and the through hole 414 of the first brake pad 41B in order. The threaded portion 433 is threadedly fixed to the connecting portion 311 of the first installation seat 31. The head portion 431 is abutted against the connecting portion 321 of the second installation seat 32. As a result, the first and second brake pads 41A and 41B are disposed in the accommodating space 36 of the main body 30 by the two supporting pillars 43, and the first and second brake pads 41A and 41B are individually movable relative to the main body 30 along Y-axis and adapted for a brake disc 71 to be disposed between the first and second brake pads 41A and 41B, as shown in FIG. 3.

Referring to FIG. 7, each of the limiting members 44 is bent from a circular thin rod and includes a vertical portion 441 and a horizontal portion 442. The horizontal portion 442 is U-shaped and thereby has an arc section 443 and two straight sections 444. The vertical portion 441 includes two branches 445 and 446 extending downwardly from the two straight sections 444 respectively, wherein the branch 445 is straight, but the branch 446 has a curved section 447.

Figure 8:
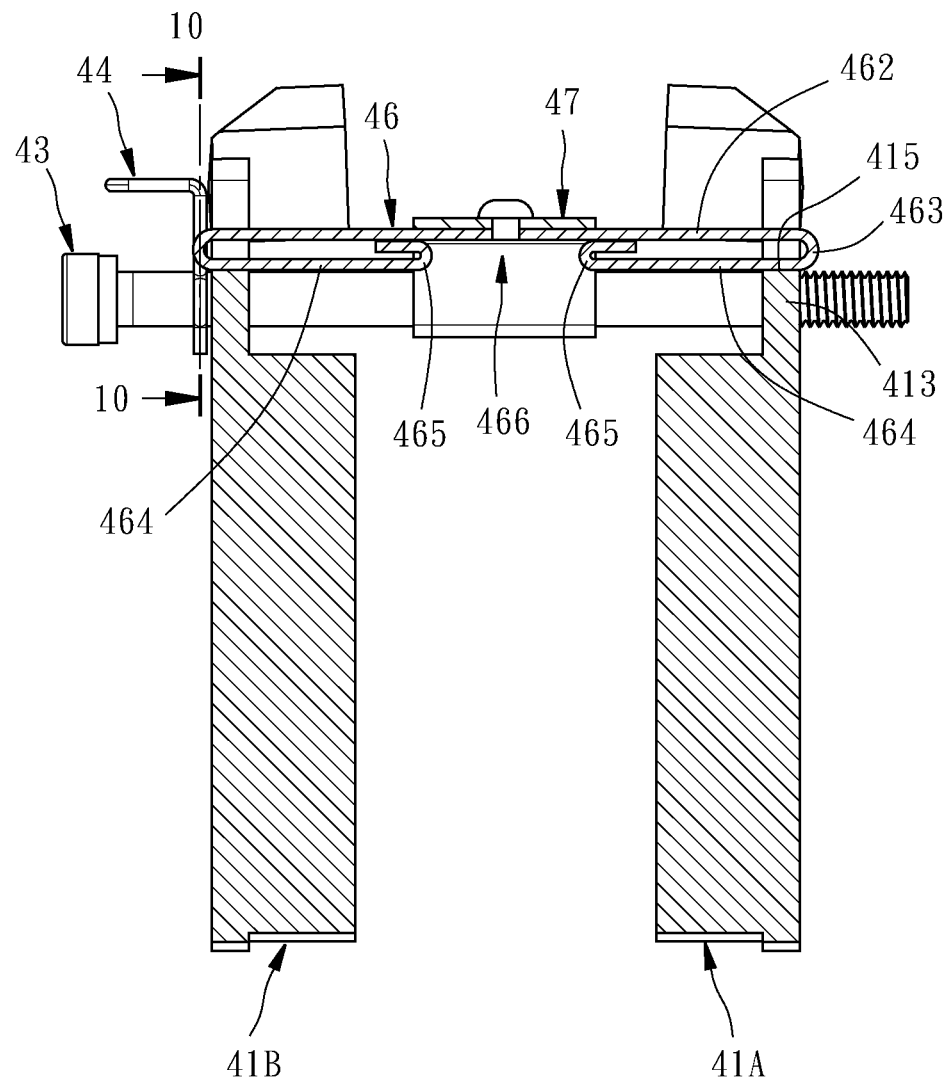
FIG. 8 and FIG. 9 are sectional views taken along the line 8-8 and the line 9-9 in FIG. 7 respectively.
Figure 9:
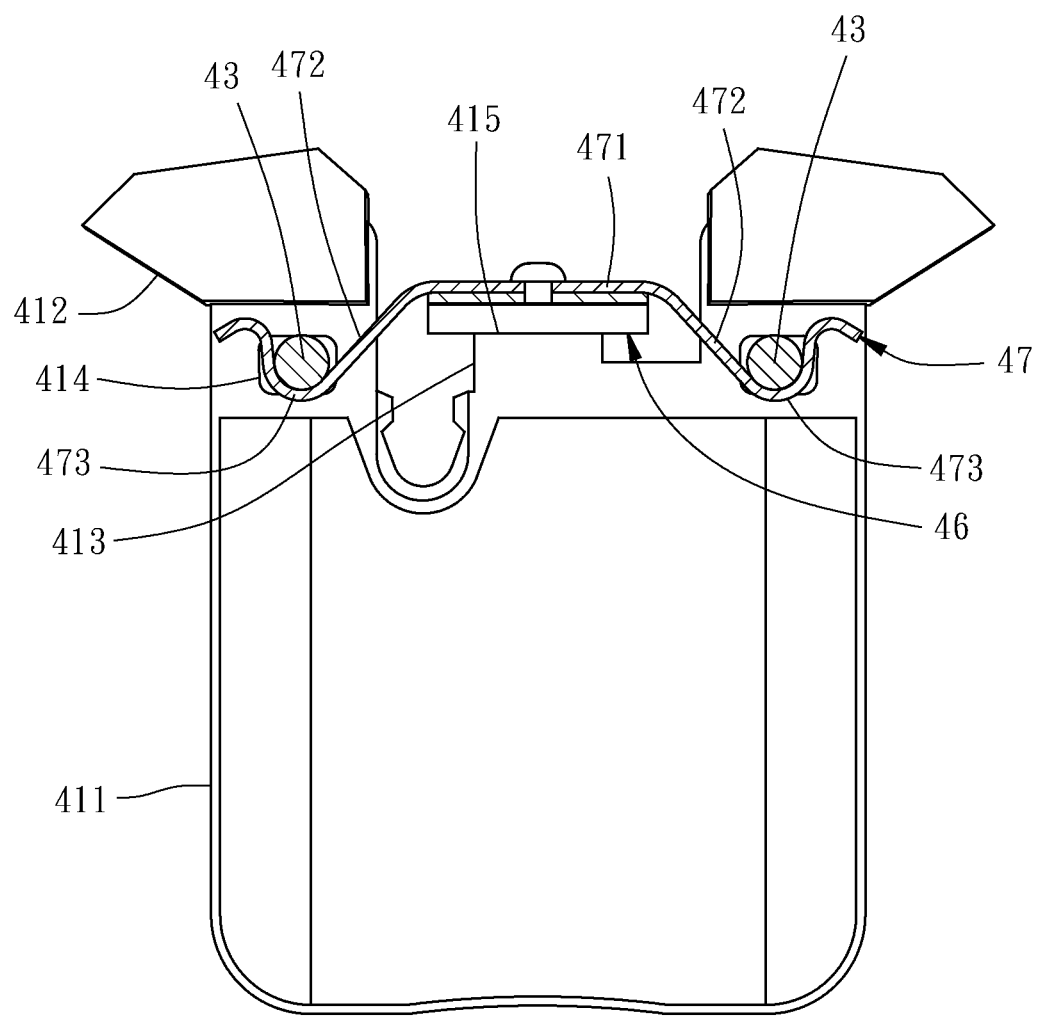
Figure 10:
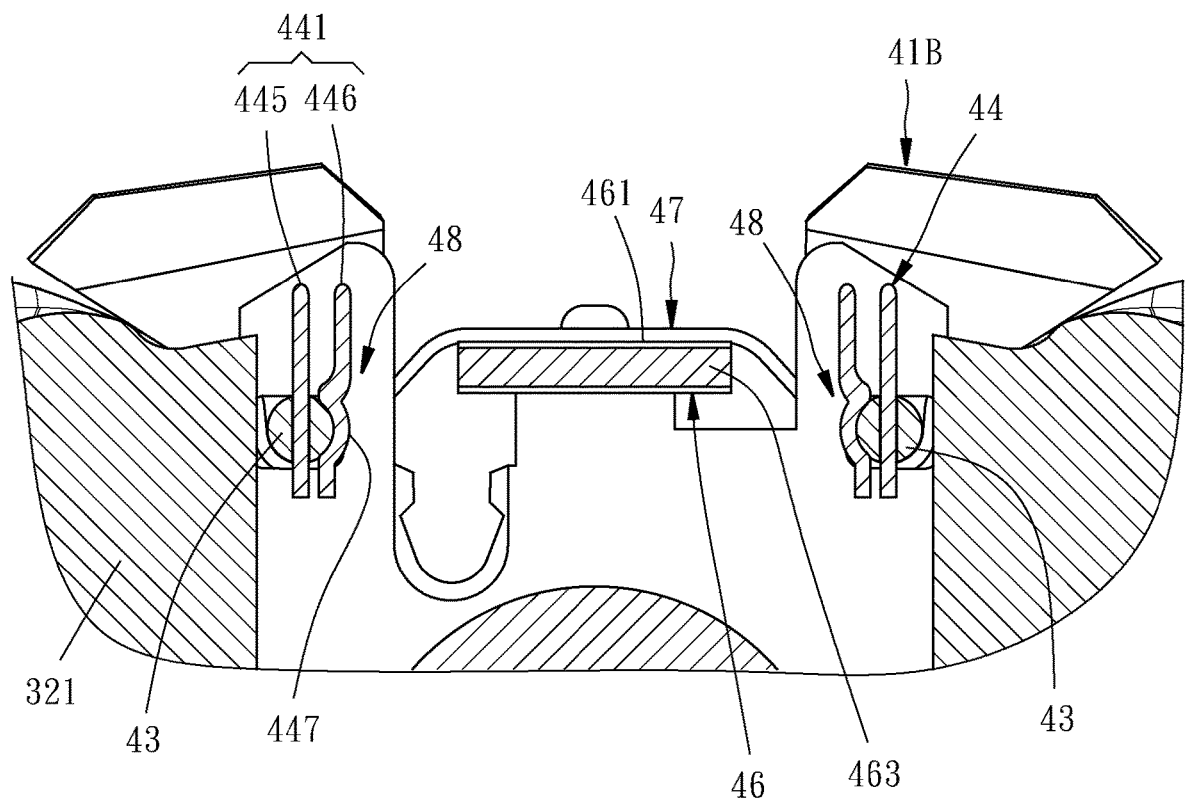
FIG. 10 is a sectional view of the hydraulic brake and electronic parking integrated caliper taken along the line 10-10 in FIG. 8.

Referring to FIG. 7 to FIG. 9, the suppressing member 45 includes a brake pad bridging plate 46, and a supporting pillar bridging plate 47 fixed on the top surface 461 of the brake pad bridging plate 46 in an intersecting manner with the brake pad bridging plate 46. The brake pad bridging plate 46 is bent from a thin plate and includes a top plate portion 462, two outer bent portions 463 integrally extending in a downward bent manner from two sides of the top plate portion 462 respectively, two bottom plate portions 464 integrally extending from the two outer bent portions 463 respectively, parallel to the top plate portion 462 and located below the top plate portion 462, and two inner bent portions 465 integrally extending in an upward bent manner from the two bottom plate portions 464 respectively and located below the top plate portion 462. A gap 466 is provided between the two inner bent portions 465 and located right below the supporting pillar bridging plate 47. The parts of the two bottom plate portions 464 close to the outer bent portions 463 are abutted on the top surfaces 415 of the inner extending portions 413 of the first and second brake pads 41A and 41B respectively. The supporting pillar bridging plate 47 is also bent from a thin plate and includes a horizontal portion 471 located on the top surface 461 of the brake pad bridging plate 46, two inclined portions 472 extending downwardly and inclinedly from the horizontal portion 471 toward the two supporting pillars 43 respectively, and two arc portions 473 extending in an arc-shaped upward bent manner from the two inclined portions 472 respectively. The two supporting pillars 43 are partially accommodated in the two arc portions 473 respectively. As a result, the suppressing member 45 is positioned on the tops of the first and second brake pads 41A and 41B by the two supporting pillars 43. At this time, two slots 48 are provided between one of the outer bent portions 463 of the brake pad bridging plate 46 and the connecting portion 321 of the second installation seat 32 and located correspondingly to the two supporting pillars 43 respectively, as shown in FIG. 10. The vertical portions 441 of the two limiting members 44 are inserted in the two slots 48 respectively. The branches 445 of the vertical portions 441 of the two limiting members 44 are fixedly inserted through the rod portions 432 of the two supporting pillars 43 respectively. The horizontal portions 442 of the two limiting members 44 extend horizontally from the top ends of the vertical portions 441 toward the first direction D1 and located above the second installation seat 32 with a tiny distance therefrom. It is to be mentioned that in order to clearly indicate where the sectional view of FIG. 10 is taken, the associated line 10-10 is marked in FIG. 8. However, FIG. 10 is not the sectional view of the brake pad assembly 40 as shown in FIG. 8 only, but the sectional view of the caliper 10.

Referring to FIG. 2 and FIG. 3, each of the first and second hydraulic pistons 51 and 52 has a close end 511 or 521, an open end 512 or 522, and an accommodating hole 513 or 523 extending from the open end 512 or 522 toward the close end 511 or 521. The first and second hydraulic pistons 51 and 52 are disposed in the first and second hydraulic cylinders 314 and 324 with the close ends 511 and 521 thereof facing toward the first and second directions D1 and D2 respectively. A hydraulic source 72 applies hydraulic oil to the first hydraulic cylinder 314 through an infusion hole 319 of the first installation seat 31, and the hydraulic oil is applied from the first hydraulic cylinder 314 to the second hydraulic cylinder 324 through a plurality of conveying pipes 37 communicating with the first and second hydraulic cylinders 314 and 324, so that the first and second hydraulic cylinders 314 and 324 and the accommodating holes 513 and 523 of the first and second hydraulic pistons 51 and 52 are filled with liquid provided by the hydraulic source 72, i.e. the hydraulic oil. As a result, the first and second hydraulic pistons 51 and 52 can be driven by the hydraulic source 72 to move relative to the main body 30 along Y-axis in the first and second hydraulic cylinders 314 and 324 respectively.

The linear displacement device 60 includes an electronic drive 61 (e.g., motor), a threaded rod 62, and a linearly displacing member 63. The electronic drive 61 is fixed to the protruding portion 312 of the first installation seat 31. The threaded rod 62 is coaxially fixed to a driving shaft 611 of the electronic drive 61, thereby capable of being driven by the electronic drive 61 to rotate. Besides, the threaded rod 62 is inserted from the electronic drive 61 toward the first direction D1 into the first hydraulic cylinder 314. The linearly displacing member 63 is disposed in the accommodating hole 513 of the first hydraulic piston 51, screwed onto the threaded rod 62 and capable of being driven by the threaded rod 62 to linearly displace relative to threaded rod 62 along Y-axis. Specifically speaking, the accommodating hole 513 of the first hydraulic piston 51 is shaped non-circularly, and the linearly displacing member 63 has a positioning portion 631 shaped correspondingly to the accommodating hole 513, as shown in FIG. 2. In this embodiment, the accommodating hole 513 and the positioning portion 631 are octagon-shaped. The positioning portion 631 is embedded in the accommodating hole 513 in a way that the linearly displacing member 63 is movable relative to the first hydraulic piston 51 along Y-axis.

When the linearly displacing member 63 is located relative to the threaded rod 62 at a first position P1 as shown in FIG. 3, the linearly displacing member 63 is just contacted with the first hydraulic piston 51, but not pushes the first hydraulic piston 51 to move. At this time, the first and second brake pads 41A and 41B are both not in contact with the brake disc 71, which means they don't generate any braking effect. When the driver wants to perform the electronic parking function, the driver actuates the electronic drive 61 by a switch in the car to drive the threaded rod 62 to rotate, thereby driving the linearly displacing member 63 to move relative to the threaded rod 62 toward the first direction D1. When the linearly displacing member 63 is moved relative to the threaded rod 62 from the first position P1 to a second position P2 as shown in FIG. 4, the linearly displacing member 63 pushes the first hydraulic piston 51 and the first brake pad 41A to move toward the first direction D1 to press against a side of the brake disc 71. Specifically speaking, in FIG. 4, the pressing portion 411 of the first brake pad 41A presses against the right side of the brake disc 71. At this time, the linearly displacing member 63, the first hydraulic piston 51 and the first brake pad 41A can't be moved toward the first direction D1 anymore, but the electronic drive 61 still continues driving the threaded rod 62 to rotate in the same direction, thereby making the threaded rod 62 rotationally move toward the second direction D2. That means at this time the relative movement of the threaded rod 62 and the linearly displacing member 63 is changed from that the linearly displacing member 63 is moved toward the first direction D1 as described above to that the linearly displacing member 63 is unmoved but the threaded rod 62 is moved toward the second direction D2, so that the position of the linearly displacing member 63 relative to the threaded rod 62 is changed from the second position P2 to a third position P3 as shown in FIG. 5. In this process, the threaded rod 62 drives the electronic drive 61 and the main body 30 to move toward the second direction D2, which means the first and second installation seats 31 and 32 are both moved toward the second direction D2 along with the threaded rod 62. Therefore, the distance between the first installation seat 31 and the first brake pad 41A in FIG. 5 is larger than such distance in FIG. 4. The movement of the second installation seat 32 makes the second hydraulic piston 52 and the second brake pad 41B press against the other side of the brake disc 71. Specifically speaking, in FIG. 5, the pressing portion 411 of the second brake pad 41B presses against the left side of the brake disc 71, such that the electronic parking function is attained. When wanting to cancel the parking function, the driver only has to use the aforementioned switch to make the electronic drive 61 reversely drive the threaded rod 62 to rotate. The relative position of the threaded rod 62 and the linearly displacing member 63 will return to the first position P1 as shown in FIG. 3, and the electronic drive 61 and the main body 30 will be driven by the threaded rod 62 to return to the position as shown in FIG. 3, so that the first and second brake pads 41A and 41B are no longer forced by the first and second hydraulic pistons 51 and 52 to press against the brake disc 71. When rotating, the brake disc 71 can make the first and second brake pads 41A and 41B return to where they are not in contact with the brake disc 71.

It is to be mentioned that because the threaded portions 433 of the supporting pillars 43 are threadedly fixed to the connecting portion 311 of the first installation seat 31, if the vibration caused by the operation of the caliper 10 makes the supporting pillar 43 rotate, which may or may not happen, the limiting member 44 inserted in the rod portion 432 of the supporting pillar 43 will rotate along with the supporting pillar 43 until the horizontal portion 442 of the limiting member 44 is abutted and stuck on the top of the second installation seat 32. In this way, the supporting pillar 43 is prevented from continuing rotating to separate from the first installation seat 31, so that safety ensuring is attained. Besides, the centrifugal force generated by the rotation of the brake disc 71 may make the first and second brake pads 41A and 41B move upwardly, i.e., move toward the positive direction of Z-axis. The aforementioned suppressing member 45 can generate suppressing effect to the first and second brake pads 41A and 41B to prevent the first and second brake pads 41A and 41B from moving upwardly.

Figure 6:
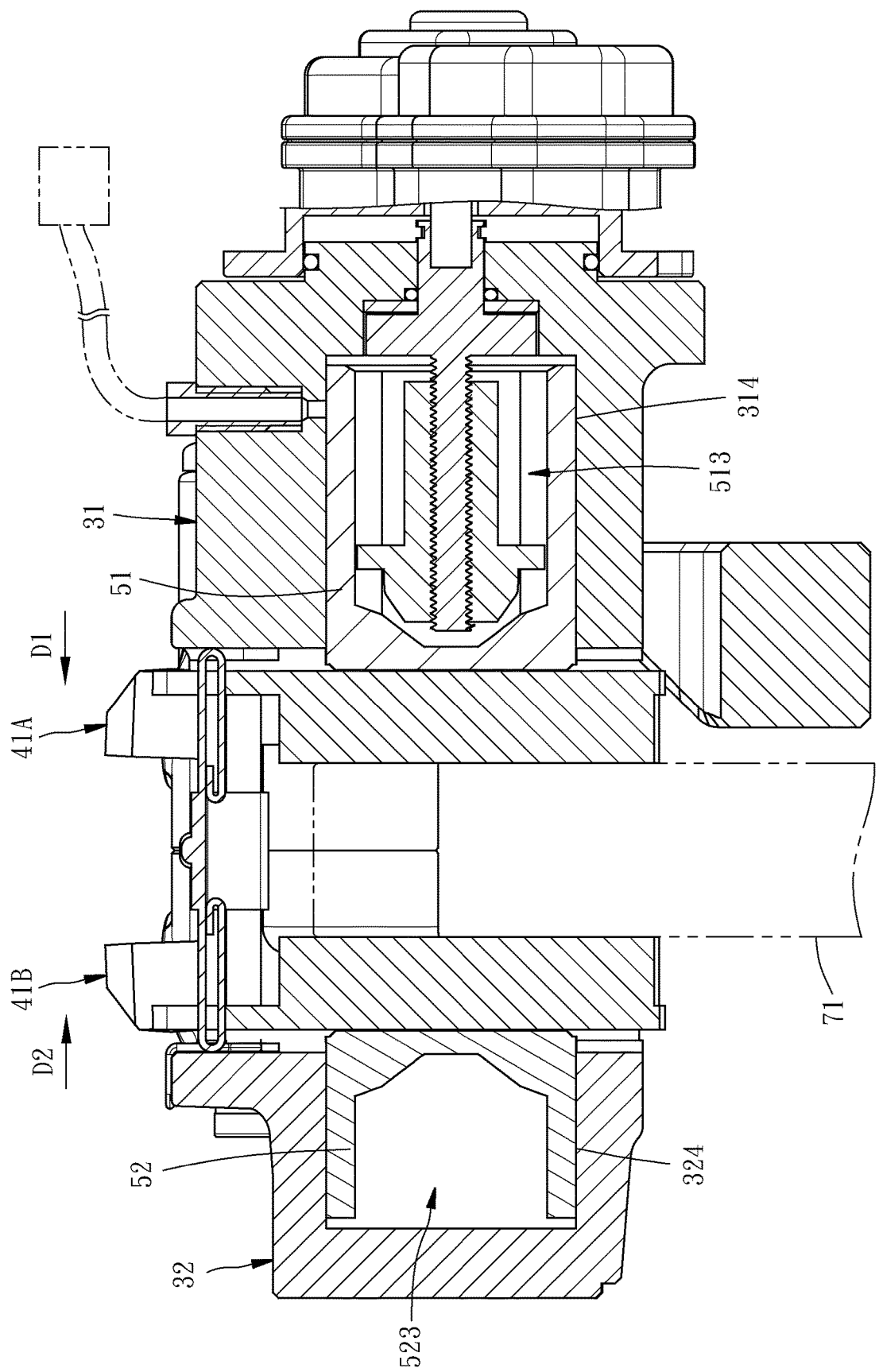
FIG. 6 is similar to FIG. 5, but FIG. 5 shows an electronic parking condition
Figure 11:
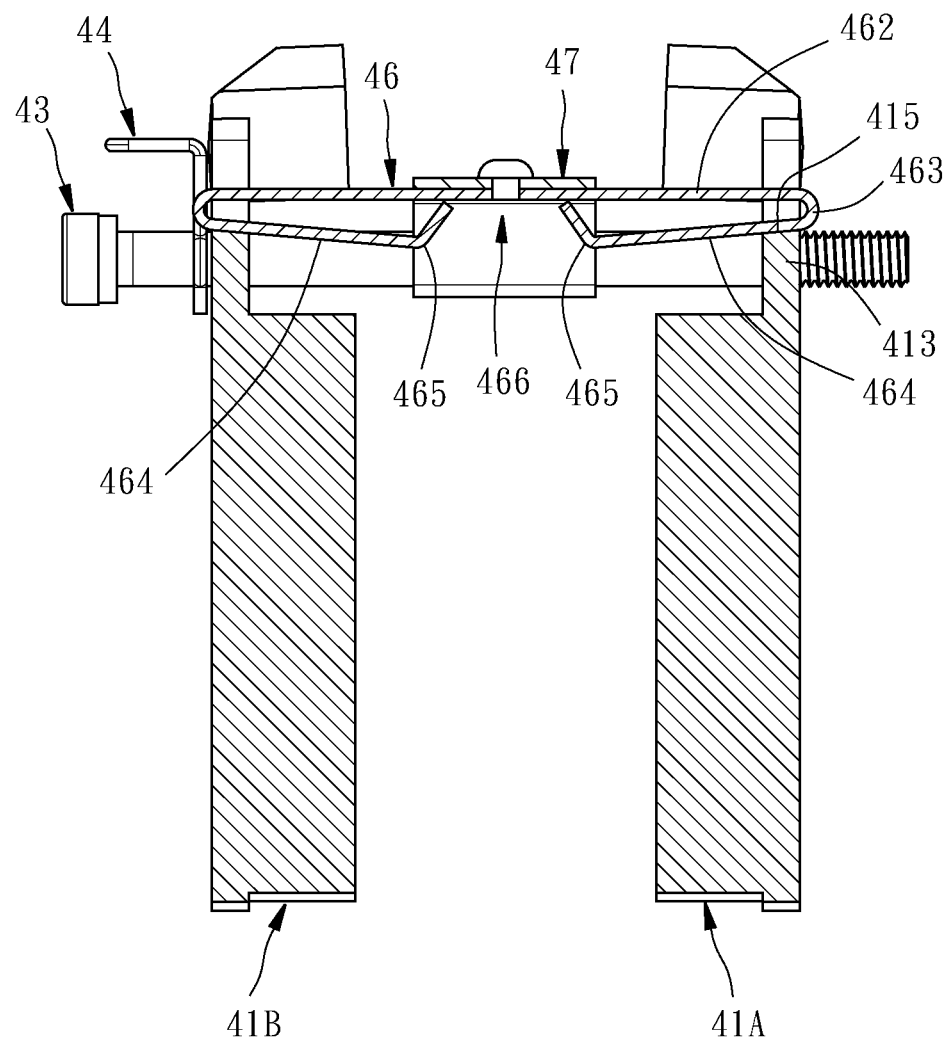
FIG. 11 is similar to FIG. 8, but showing another configuration of a brake pad bridging plate of a suppressing member.

When the driver wants to perform the braking function while the car is moving, the driver actuates the hydraulic source 72 by the brake pedal to apply more hydraulic oil to the first and second hydraulic cylinders 314 and 324 and the accommodating holes 513 and 523 of the first and second hydraulic pistons 51 and 52. In this way, the first and second hydraulic pistons 51 and 52 are driven to respectively push the first and second brake pads 41A and 41B to move toward the first and second directions D1 and D2 to press against two sides of the brake disc 71, as shown in FIG. 6, thereby generating the hydraulic brake function. Likewise, when the user releases the brake pedal, the first and second brake pads 41A and 41B are no longer forced by the first and second hydraulic pistons 51 and 52 to press against the brake disc 71. When rotating, the brake disc 71 will make the first and second brake pads 41A and 41B return to where they are not in contact with the brake disc 71. Besides, in this embodiment, the bottom plate portions 464 of the brake pad bridging plate 46 extend parallel to the top plate portion 462. However, the present invention is unlimited thereto. For example, another possibly implemented configuration of the brake pad bridging plate 46 of the present invention is shown in FIG. 11, wherein the bottom plate portions 464 extend from the outer bent portions 463 inwardly, downwardly and inclinedly with respect to the top plate portion 462. In this way, the bottom plate portions 464 of the brake pad bridging plate 46 can not only generate the suppressing effect to the first and second brake pads 41A and 41B to prevent the first and second brake pads 41A and 41B from moving upwardly. When the parking or braking function is canceled, the inclined bottom plate portions 464 can provide an outward elastically restoring force, which facilitates the first and second brake pads 41A and 41B to return to where they are not in contact with the brake disc 71.

In conclusion, the hydraulic brake and electronic parking integrated caliper 10 of the present invention is driven by a hydraulic drive (i.e., the hydraulic source 72) and the electronic drive 61 to attain the service brake and parking brake functions, and the present invention uses a simple structure to apply two hydraulic pistons to perform the service brake function, which can generate relatively larger clamping force. Besides, the linear displacement device of the existing electronic parking caliper can be kept to be combined with the members of the present invention other than the linear displacement device 60, so that the existing electronic parking caliper can be refitted as the caliper of the present invention to generate relatively larger clamping force.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A caliper comprising:
    a base;
    a main body disposed on the base in a way that the main body is moveable relative to the base along an axis;
    a first brake pad and a second brake pad, which are disposed in the main body, moveable relative to the main body along the axis individually, and adapted for a brake disc to be disposed between the first brake pad and the second brake pad;
    a first hydraulic piston and a second hydraulic piston, which are disposed in the main body and drivenable by a hydraulic source to move relative to the main body along the axis, when being driven by the hydraulic source, the first hydraulic piston and the second hydraulic piston respectively pushing the first brake pad and the second brake pad to move toward a first direction and a second direction to press against the brake disc;
    an electronic drive fixed to the main body;
    a threaded rod, which is disposed on the electronic drive, drivenable by the electronic drive to rotate, and inserted into the main body; and
    a linearly displacing member screwed onto the threaded rod and drivenable by the threaded rod to linearly displace relative to the threaded rod along the axis to a first position, a second position and a third position, when the linearly displacing member is moved relative to the threaded rod from the first position to the second position, the linearly displacing member pushing the first hydraulic piston and the first brake pad to move toward the first direction so as to press against the brake disc, when the linearly displacing member is moved relative to the threaded rod from the second position to the third position, the threaded rod, the electronic drive and the main body being moved toward the second direction to make the second hydraulic piston and the second brake pad press against the brake disc;

wherein the main body comprises a first installation seat and a second installation seat, which are fixed to each other; the first brake pad, the second brake pad and the brake disc are accommodated in an accommodating space formed between a first inner surface of the first installation seat, which faces toward the first direction, and a second inner surface of the second installation seat, which faces toward the second direction; the first installation seat has a first hydraulic cylinder extending from the first inner surface toward the second direction; the second installation seat has a second hydraulic cylinder extending from the second inner surface toward the first direction; the first hydraulic piston and the second hydraulic piston are disposed in the first hydraulic cylinder and the second hydraulic cylinder, respectively;

wherein the first installation seat of the main body is attached to the base by two shafts; the base comprises a basal portion, and two installation arms extending upwardly from the basal portion; the first installation seat comprises a connecting portion connected with the second installation seat, and a protruding portion protruding from the connecting portion toward the second direction; the protruding portion comprises a middle section provided therein with the first hydraulic cylinder, and two extending arms located on two sides of the middle section respectively; the two installation arms of the base are located between the connecting portion and the two extending arms of the first installation seat respectively; the two shafts are inserted through the two extending arms of the first installation seat respectively, inserted through the two installation arms of the base respectively, and fixed to the connecting portion of the first installation seat.

2. The caliper as claimed in claim 1, wherein the first hydraulic piston has a non-circular accommodating hole; the linearly displacing member has a positioning portion shaped correspondingly to the non-circular accommodating hole; the positioning portion is embedded in the accommodating hole in a way that the linearly displacing member is movable relative to the first hydraulic piston along the axis.

3. The caliper as claimed in claim 1, wherein each of the first hydraulic piston and the second hydraulic piston has a close end, an open end, and an accommodating hole extending from the open end toward the close end for accommodating liquid provided by the hydraulic source; the first hydraulic piston and the second hydraulic piston are disposed in the first hydraulic cylinder and the second hydraulic cylinder in a way that the close ends of the first hydraulic piston and the second hydraulic piston face toward the first direction and the second direction, respectively.

4. The caliper as claimed in claim 3, wherein the accommodating hole of the first hydraulic piston has a non-circular shape; the linearly displacing member has a positioning portion shaped correspondingly to the accommodating hole of the first hydraulic piston; the positioning portion is embedded in the accommodating hole of the first hydraulic piston in a way that the linearly displacing member is movable relative to the first hydraulic piston along the axis.

5. The caliper as claimed in claim 1, wherein the first brake pad and the second brake pad are attached to the main body by two supporting pillars; the two supporting pillars are inserted through the first brake pad and the second brake pad and fixed to the main body.

6. The caliper as claimed in claim 5, wherein a suppressing member is disposed between the two supporting pillars; the suppressing member are positioned on tops of the first brake pad and the second brake pad by the two supporting pillars.

7. The caliper as claimed in claim 6, wherein the suppressing member comprises a brake pad bridging plate disposed on the tops of the first brake pad and the second brake pad, and a supporting pillar bridging plate fixed to a top surface of the brake pad bridging plate in an intersecting manner with the brake pad bridging plate and connected with the two supporting pillars.

8. The caliper as claimed in claim 7, wherein the brake pad bridging plate comprises a top plate portion, two outer bent portions integrally extending in a downward bent manner from two sides of the top plate portion respectively, two bottom plate portions integrally extending from the two outer bent portions respectively, parallel or inclined to the top plate portion and located below the top plate portion, and two inner bent portions integrally extending in an upward bent manner from the two bottom plate portions respectively and located below the top plate portion; a gap is provided between the two inner bent portions and located right below the supporting pillar bridging plate; the two bottom plate portions are abutted on the tops of the first brake pad and the second brake pad respectively.

9. The caliper as claimed in claim 8, wherein the supporting pillar bridging plate comprises a horizontal portion located on the top surface of the brake pad bridging plate, two inclined portions downwardly and inclinedly extending from the horizontal portion toward the two supporting pillars respectively, and two arc portions extending from the two inclined portions respectively in an arc-shaped upward bent manner; the two supporting pillars are partially accommodated in the two arc portions respectively.

10. The caliper as claimed in claim 7, wherein the supporting pillar bridging plate comprises a horizontal portion located on the top surface of the brake pad bridging plate, two inclined portions downwardly and inclinedly extending from the horizontal portion toward the two supporting pillars respectively, and two arc portions extending from the two inclined portions respectively in an arc-shaped upward bent manner; the two supporting pillars are partially accommodated in the two arc portions respectively.

11. The caliper as claimed in claim 5, wherein each of the first hydraulic piston and the second hydraulic piston has a close end, an open end, and an accommodating hole extending from the open end toward the close end for accommodating liquid provided by the hydraulic source; the first hydraulic piston and the second hydraulic piston are disposed in the first hydraulic cylinder and the second hydraulic cylinder in a way that the close ends of the first hydraulic piston and the second hydraulic piston face toward the first direction and the second direction, respectively.

12. The caliper as claimed in claim 11, wherein the accommodating hole of the first hydraulic piston has a non-circular shape; the linearly displacing member has a positioning portion shaped correspondingly to the accommodating hole of the first hydraulic piston; the positioning portion is embedded in the accommodating hole of the first hydraulic piston in a way that the linearly displacing member is movable relative to the first hydraulic piston along the axis.

13. A caliper comprising:
a base;
a main body disposed on the base in a way that the main body is moveable relative to the base along an axis;
a first brake pad and a second brake pad, which are disposed in the main body, moveable relative to the main body along the axis individually, and adapted for a brake disc to be disposed between the first brake pad and the second brake pad;
a first hydraulic piston and a second hydraulic piston, which are disposed in the main body and drivenable by a hydraulic source to move relative to the main body along the axis, when being driven by the hydraulic source, the first hydraulic piston and the second hydraulic piston respectively pushing the first brake pad and the second brake pad to move toward a first direction and a second direction to press against the brake disc;
an electronic drive fixed to the main body;
a threaded rod, which is disposed on the electronic drive, drivenable by the electronic drive to rotate, and inserted into the main body; and
a linearly displacing member screwed onto the threaded rod and drivenable by the threaded rod to linearly displace relative to the threaded rod along the axis to a first position, a second position and a third position, when the linearly displacing member is moved relative to the threaded rod from the first position to the second position, the linearly displacing member pushing the first hydraulic piston and the first brake pad to move toward the first direction so as to press against the brake disc, when the linearly displacing member is moved relative to the threaded rod from the second position to the third position, the threaded rod, the electronic drive and the main body being moved toward the second direction to make the second hydraulic piston and the second brake pad press against the brake disc;
wherein the first brake pad and the second brake pad are attached to the main body by two supporting pillars; the two supporting pillars are inserted through the first brake pad and the second brake pad and fixed to the main body;
wherein a suppressing member is disposed between the two supporting pillars; the suppressing member are positioned on tops of the first brake pad and the second brake pad by the two supporting pillars;
wherein the suppressing member comprises a brake pad bridging plate disposed on the tops of the first brake pad and the second brake pad, and a supporting pillar bridging plate fixed to a top surface of the brake pad bridging plate in an intersecting manner with the brake pad bridging plate and connected with the two supporting pillars;
wherein the brake pad bridging plate comprises a top plate portion, two outer bent portions integrally extending in a downward bent manner from two sides of the top plate portion respectively, two bottom plate portions integrally extending from the two outer bent portions respectively, parallel or inclined to the top plate portion and located below the top plate portion, and two inner bent portions integrally extending in an upward bent manner from the two bottom plate portions respectively and located below the top plate portion; a gap is provided between the two inner bent portions and located right below the supporting pillar bridging plate;
the two bottom plate portions are abutted on the tops of the first brake pad and the second brake pad respectively;
wherein the supporting pillar bridging plate comprises a horizontal portion located on the top surface of the brake pad bridging plate, two inclined portions downwardly and inclinedly extending from the horizontal portion toward the two supporting pillars respectively, and two arc portions extending from the two inclined portions respectively in an arc-shaped upward bent manner; the two supporting pillars are partially accommodated in the two arc portions respectively;
wherein two slots are provided between one of the outer bent portions of the brake pad bridging plate and the main body and located correspondingly to the two supporting pillars respectively; two limiting members are inserted in the two slots respectively; each of the limiting members has a vertical portion inserted through an associated one of the slots and fixed to an associated one of the supporting pillars, and a horizontal portion extending from a top end of the vertical portion horizontally and located above the main body.

14. A caliper comprising:
a base;
a main body disposed on the base in a way that the main body is moveable relative to the base along an axis;
a first brake pad and a second brake pad, which are disposed in the main body, moveable relative to the main body along the axis individually, and adapted for a brake disc to be disposed between the first brake pad and the second brake pad;
a first hydraulic piston and a second hydraulic piston, which are disposed in the main body and drivenable by a hydraulic source to move relative to the main body along the axis, when being driven by the hydraulic source, the first hydraulic piston and the second hydraulic piston respectively pushing the first brake pad and the second brake pad to move toward a first direction and a second direction to press against the brake disc;
an electronic drive fixed to the main body;
a threaded rod, which is disposed on the electronic drive, drivenable by the electronic drive to rotate, and inserted into the main body; and
a linearly displacing member screwed onto the threaded rod and drivenable by the threaded rod to linearly displace relative to the threaded rod along the axis to a first position, a second position and a third position, when the linearly displacing member is moved relative to the threaded rod from the first position to the second position, the linearly displacing member pushing the first hydraulic piston and the first brake pad to move toward the first direction so as to press against the brake disc, when the linearly displacing member is moved relative to the threaded rod from the second position to the third position, the threaded rod, the electronic drive and the main body being moved toward the second direction to make the second hydraulic piston and the second brake pad press against the brake disc;
wherein the first brake pad and the second brake pad are attached to the main body by two supporting pillars; the two supporting pillars are inserted through the first brake pad and the second brake pad and fixed to the main body;
wherein a suppressing member is disposed between the two supporting pillars; the suppressing member are positioned on tops of the first brake pad and the second brake pad by the two supporting pillars;

wherein the suppressing member comprises a brake pad bridging plate disposed on the tops of the first brake pad and the second brake pad, and a supporting pillar bridging plate fixed to a top surface of the brake pad bridging plate in an intersecting manner with the brake pad bridging plate and connected with the two supporting pillars;

wherein the brake pad bridging plate comprises a top plate portion, two outer bent portions integrally extending in a downward bent manner from two sides of the top plate portion respectively, two bottom plate portions integrally extending from the two outer bent portions respectively, parallel or inclined to the top plate portion and located below the top plate portion, and two inner bent portions integrally extending in an upward bent manner from the two bottom plate portions respectively and located below the top plate portion; a gap is provided between the two inner bent portions and located right below the supporting pillar bridging plate; the two bottom plate portions are abutted on the tops of the first brake pad and the second brake pad respectively;

wherein two slots are provided between one of the outer bent portions of the brake pad bridging plate and the main body and located correspondingly to the two supporting pillars respectively; two limiting members are inserted in the two slots respectively; each of the limiting members has a vertical portion inserted through an associated one of the slots and fixed to an associated one of the supporting pillars, and a horizontal portion extending from a top end of the vertical portion horizontally and located above the main body.

* * * * *